April 26, 1966  D. M. GREY  3,247,653
SWATHER ATTACHMENT FOR HARVESTING CROPS ON SLOPES
Filed Sept. 14, 1964  2 Sheets-Sheet 1

INVENTOR.
Donald M. Grey
BY
Hovey, Schmidt, Johnson & Hovey
ATTORNEYS.

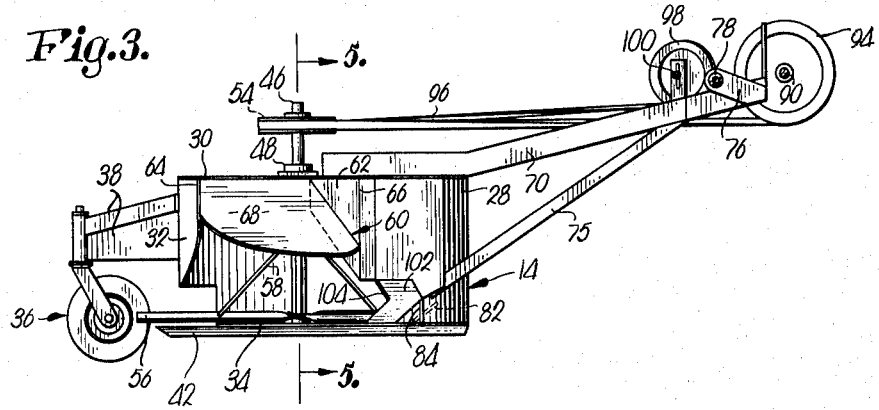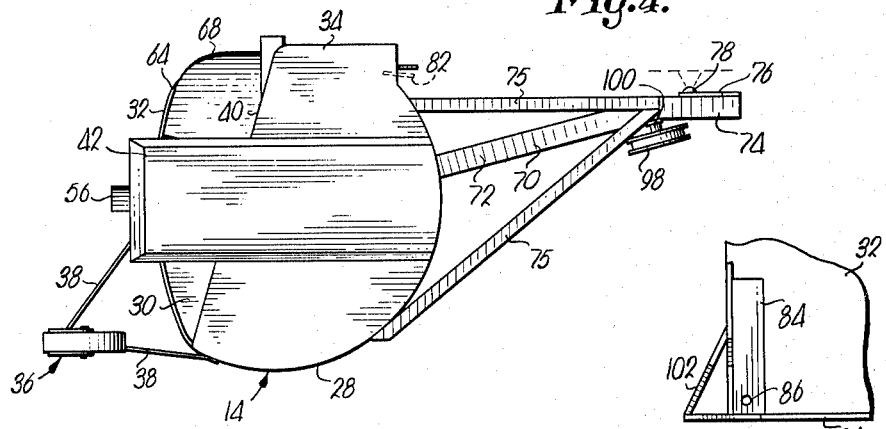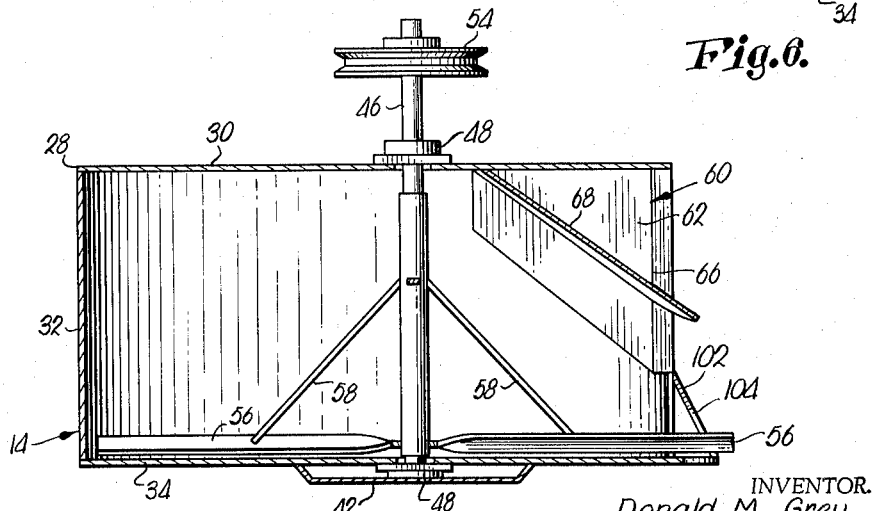

United States Patent Office 3,247,653
Patented Apr. 26, 1966

3,247,653
SWATHER ATTACHMENT FOR HARVESTING
CROPS ON SLOPES
Donald M. Grey, 6261 W. Avenue K, Lancaster, Calif.
Filed Sept. 14, 1964, Ser. No. 396,327
6 Claims. (Cl. 56—6)

This invention relates to farm implements and, more particularly, to a mowing machine for cutting crops.

In arid regions where crops require irrigation the fields are provided with spaced, elongated mounds between which the crop grows and which extend transversely from the ditch which carries water to the field. When the crop is cut, the mower, if it remains between the mounds, is not able to cut the crop on the mounds. If it is desired to simultaneously cut the crop on a mound and the crop in the space between adjacent mounds, the mower must be moved along a path which is inclined with respect to the horizontal. By operating in this manner, the mower cannot cut a portion of the crop which grows in the region defining the junction between the mound and the portion of the field adjacent thereto. As a result, this portion of the crop remains in the ground unless the mower is moved over the ground a second time in order to cut this remaining part of the crop. Moving the mower over the field a second time increases the cost of the cutting operation.

The present invention is directed to crop-cutting apparatus which includes an assembly for cutting the crop between the mounds and a mechanism swingably mounted on the assembly for cutting the crop on the side of a mound as the crop is being cut by the assembly. The mechanism is movable under the influence of the assembly and operated from the drive unit thereof so that an external power source for operating the mechanism is unnecessary. Moreover, the mechanism is situated with respect to the assembly so that the crop cut by the mechanism will be deposited in advance of and in alignment with the assembly so that means carried thereby, such as a reel or the like, may sweep the crop cut by the mechanism rearwardly into a collection area forming a part of the assembly. The present invention thus overcomes the problems inherent in the operation of conventional mowers which are unable to simultaneously cut the crop growing on the sides of the aforesaid mounds and the crop growing in the space between adjacent mounds.

It is, therefore, the primary object of the present invention to provide crop-cutting apparatus having a primary cutting unit and a secondary cutting unit pivotally mounted at the side of the primary unit, whereby a crop growing on a horizontal portion of the ground and on an inclined portion adjacent thereto, may be simultaneously cut to preclude the cutting of the crop on the aforesaid portions of the ground in separate operations.

Another object of the present invention is the provision of a cutter attachment for a mowing machine which is swingably mounted at the side of the machine and disposed for projecting the crop cut thereby into the path of the machine so that a reel or the like, carried by the machine, may sweep the crop cut by the attachment rearwardly toward and into a collection area as the crop cut by the machine is swept thereinto.

A further object of the present invention is the provision of an attachment of the type described which is operated from the drive unit of the machine so as to preclude a separate power source for operation thereof.

In the drawings:

FIG. 3 is a side elevational view of the attachment looking in a direction outwardly from the machine;

FIG. 4 is a bottom plan view of the attachment;

FIG. 5 is an enlarged, cross-sectional view of the attachment taken along line 5—5 of FIG. 3; and FIG. 6 is an enlarged, fragmentary, end elevational view of the attachment showing means which form a part of the hinge structure for pivotally connecting the attachment to the machine.

The present invention provides cutting apparatus for cutting the crop growing on the sides of mounds as the crop is being cut in the space between the mounds. The apparatus includes a cutting assembly for cutting the crop growing between the mounds and a cutting mechanism pivotally attached to the side of the machine, whereby the mechanism may move along a path angularly disposed with respect to the path of travel of the cutting assembly which moves between the mounds. The mechanism is provided with baffle means for directing the crop cut thereby into the path of travel of the assembly so that a reel or the like on the assembly may sweep the crop cut by the mechanism and the crop cut by the assembly rearwardly and into a collection area forming a part of the assembly. Means is provided for operating the mechanism from the drive unit of the assembly. In this respect, the mechanism is hingedly mounted on the assembly in a manner such that the mechanism may be tilted without interfering with the operation thereof.

Figure 1:
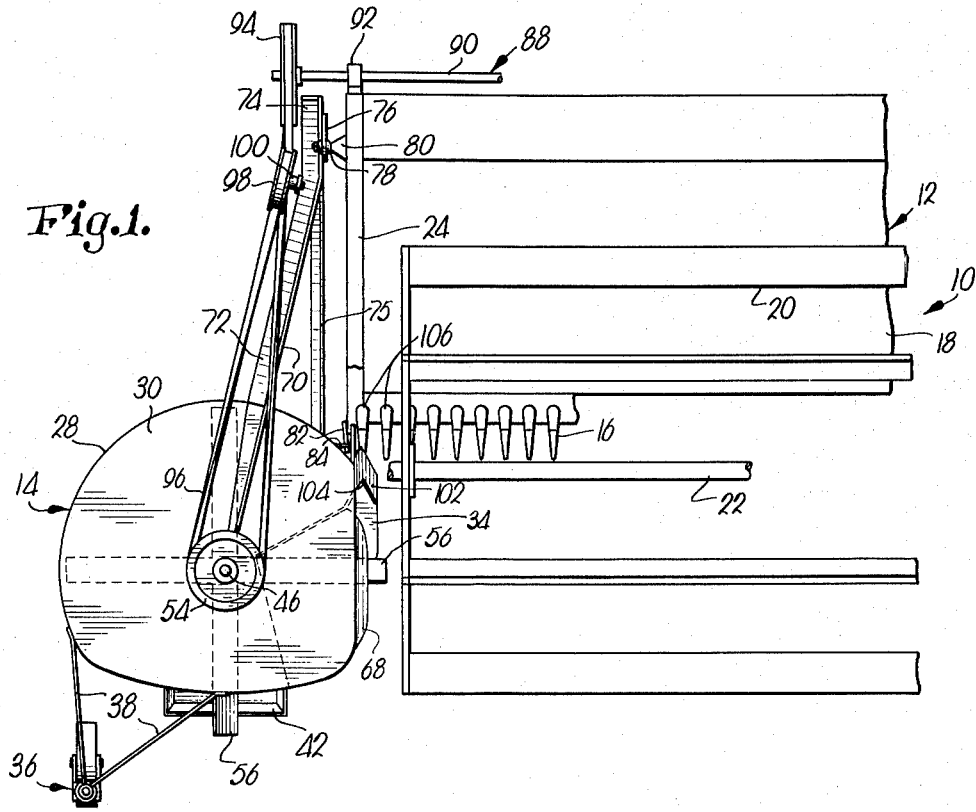
FIGURE 1 is a top plan view of a portion of a mowing machine illustrating the cutter attachment coupled at the side thereof and operated from the drive unit of the machine.
Figure 2:
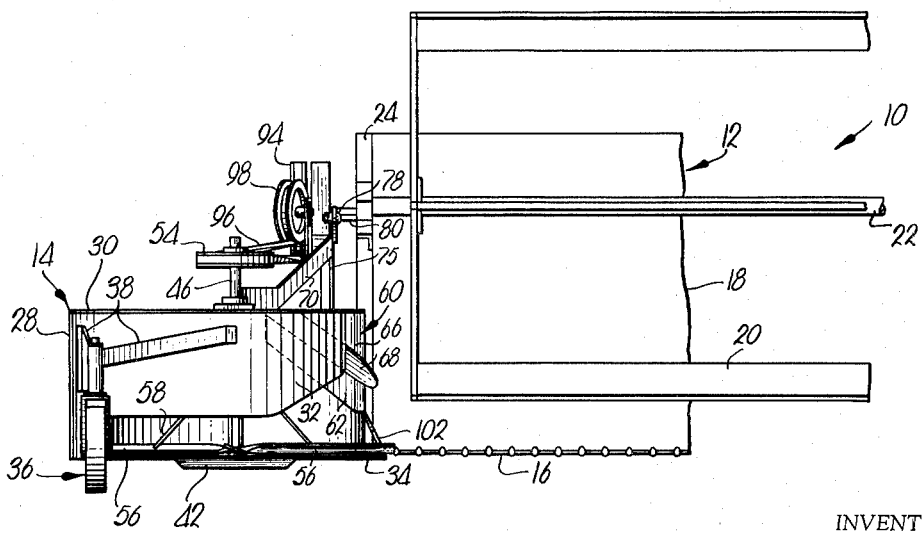
FIG. 2 is a front elevational view of the apparatus shown in FIG. 1.

Cutting apparatus 10 includes a crop cutting assembly 12, and a crop-cutting mechanism 14 pivotally mounted at one side of assembly 12 and movable therewith over the ground. Assembly 12 may be of any construction, but for purposes of illustration, it includes a transversely extending cutter bar 16 disposed in advance of structure 18 which defines a collection area. A reel 20 having a shaft 22 is mounted for rotation on the opposed sides 24 of assembly 12, only one of the sides 24 being illustrated in FIGS. 1 and 2. A vehicle (not shown) coupled with assembly 12 is provided for moving the same over the ground with cutter bar 16 positioned at a predetermined height above ground level 26, as illustrated in FIG. 2, so as to cut a growing crop projecting upwardly from ground level 26 at a predetermined location. Reel 20 is disposed for sweeping the growing crop into cutter bar 16 as assembly 12 advances over the ground and for sweeping the cut crop rearwardly into the collection area defined by structure 18.

Mechanism 14 includes a housing 28 having a top wall 30, an arcuate side wall 32 depending from top wall 30, and a bottom wall 34 secured to the lowermost edge of side wall 32. A wheel and axle assembly 36 is secured by brackets 38 to side wall 32 and is disposed in advance and to the side of housing 28 as shown in FIG. 1.

Bottom 34 has a forwardmost edge 40 which is spaced rearwardly from the forwardmost portion of the lowermost edge of side wall 32 to define a cutting zone for mechanism 14. An elongated, plate-like guard 42 is rigid to bottom 34, as shown in FIGS. 4 and 5, and provides a support for a bearing 44 which journals the lowermost end of a shaft 46 forming a part of cutting structure for mechanism 14. A bearing 48 is secured to the upper surface of top 30 and journals the upper extremity of shaft 46, it being clear that top 30 and bottom 34 are provided with openings 50 and 52 respectively, through which shaft 46 passes. A pulley 54 is secured to the upper end of shaft 46.

A number of crop-cutting blades 56 are secured to and extend radially outwardly from shaft 46 adjacent the lowermost end thereof and are rotatable therewith. Braces 58 are secured to shaft 46 and to blades 56 intermediate the ends of the latter to provide structural rigidity for blades 56 as the same are rotated under the influence of shaft 46. Blades 56 are substantially equal in length and rotate within housing 28 in close proximity to the inner surface of side wall 32. As blades 56 move into the cutting zone defined by edge 40 of bottom 34, a crop growing in advance of mechanism 14 will be cut by the blades and carried therewith to the side of mechanism 14, depending upon the direction of rotation of shaft 46. Blades 56 rotate in a clockwise sense when viewing FIG. 4 so that a crop cut by blades 56 will move in a counter-clockwise sense when viewing FIG. 1.

To prevent the crop from continuing through housing 28 after it has been cut, deflector means 60 is provided within housing 28 to direct the crop laterally of mechanism 14 and into the path of travel of assembly 12. Deflector means 60 includes a generally vertical baffle 62 which depends from the lower surface of top 30 and is secured at the outer, vertical edge thereof to the proximal extremity of side wall 32. In this respect, side wall 32 is provided with a pair of spaced end edges 64 and 66 to define an opening through which the crop cut by mechanism 14 may pass as the same is directed laterally into the path of assembly 12, it being clear that baffle 62 is secured to edge 66. A second baffle 68 extends through the opening defined by edges 64 and 66 and is inclined downwardly and outwardly with respect to the lower surface of top 30 as shown in FIG. 5. Moreover, the leading edge portion of baffle 68 is above the trailing edge portion thereof.

The innermost extremity of baffle 68 is secured to the lower surface of top 30, and the rearmost extremity of baffle 68 is secured to the front face of baffle 62. The crop cut by blades 56 will therefore, be prevented from rotating within housing 28 by virtue of the presence of baffle 62 and the cut crop will be directed laterally from housing 28 through the opening defined by edges 64 and 66 by virtue of the presence of baffle 68.

A beam 70 is rigid to the upper surface of top 30 and extends rearwardly and slightly to the side thereof as illustrated in FIGS. 1 and 3. For purposes of illustration, beam 70 is transversely L-shaped and has a first portion 72 which is angularly disposed with respect to the path of travel of mechanism 14 and a second portion 74 which is substantially parallel to the path of mechanism 14. Braces 75, connected to side wall 32, extend rearwardly therefrom and interconnect at the rear end of beam 70 to provide structural rigidity for mechanism 14. An arm 76 rigid to portion 74 provides a support for a universal joint 78 on the outer end of a projection 80 extending laterally from the proximal side 24. Universal joint 78 is above and to the rear of cutter bar 16 as shown in FIGS. 1 and 2 and provides a hinge member for pivoting portion 74 on assembly 12.

A pin 82 is rigid to side 24 adjacent cutter bar 16, pin 82 being shown in dashed lines in FIG. 3 as being inclined and in alignment with universal joint 78 to the rear of and above pins 82. As shown in FIG. 1, pin 82 is slightly angularly disposed with respect to the path of travel of assembly 12 so that the longitudinal axis of pin 82 will pass directly through universal joint 78.

Mechanism 14 is provided with a generally vertical plate 84 secured to side wall 32 and provided with an opening for rotatably receiving pin 82. Hence, mechanism 14 is pivotally mounted at a pair of spaced points on side 24 by means of a pair of hinge members defined by universal joint 78 and pin 82. Mechanism 14 is swingable about the axis which passes through pin 82 and universal joint 78 so that mechanism 14 may be angularly disposed with respect to assembly 12 as apparatus 10 moves over the ground.

Assembly 12 includes a drive unit 88 including a shaft 90 journalled for rotation on the rear of side 24 by a bearing 92. A pulley 94 is secured to the outer end of shaft 90. An endless, flexible belt 96 is trained over pulleys 54 and 94, and over a pulley 98 journalled on a stub shaft 100 projecting laterally from the rear end of portion 72 of beam 70.

As shown in FIGS. 1–3, belt 96 passes over pulley 94, beneath pulley 98, around pulley 54 and, once again, about pulley 94. Pulley 98 is provided to change the direction of belt 96 so that shaft 46 may be rotated even though mechanism 14 is at the side of assembly 12. As mechanism 14 pivots into a position angularly disposed with respect to assembly 12, pulley 98 will also pivot inasmuch as the same is coupled with beam 70. However, belt 96 will remain in coupled relationship to pulleys 54, 94 and 98 by virtue of the various dispositions of the same; accordingly, mechanism 14 will continue to operate without interruption.

A plate 102 is secured to side wall 32 and extends downwardly and inwardly toward assembly 12 as shown in FIGS. 1 and 5. Plate 102 has a V-shaped notch 104 therein for clearing the tips of blades 56 and has an outer surface which serves to guide the crop into the space between the end pair of guards 106 of cutter bar 16 while preventing such crop from passing between the end guard 106 and side wall 32. In this way, all of the crop in advance of cutter bar 16 will be cut and none will be left standing after apparatus 10 has passed.

In operation, apparatus 10 is moved over the ground so that cutter bar 16 will cut a swath of a crop growing in advance thereof and blades 56 will cut a smaller swath of crop also growing in advance thereof. Thus, cutter bar 16 moves over a first stretch of ground and blades 56 move over a second stretch of ground extending longitudinally of and directly adjacent to the stretch over which cutter bar 16 passes. Blades 56 extend sufficiently into the path of travel of the end guards 106 so that substantially all of the crop will be cut by cutter bar 16 and blades 56.

As apparatus 10 approaches an area in the field which is provided with a crop growing on the side of a mound, the wheel of assembly 36 will move over the mound and cause mechanism 14 to become inclined with respect to assembly 12. Mechanism 14 will pivot about the axis defined by universal joint 78 and pin 82 and will be maintained in this inclined position as long as the wheel of assembly 36 moves over the side of the mound. Simultaneously then, the crop laterally of the mound will be cut by cutter bar 16 and the crop on the mound will be cut by blades 56. The crop cut by mechanism 14 will be thrown laterally and into the path of assembly 12 and will be deposited on the crop in advance of cutter bar 16. The crop cut by mechanism 14 will be swept rearwardly by reel 20 and, by virtue of being deposited on the crop in advance of assembly 12, will pass over cutter bar 16 and thence into the collection area defined by structure 18.

As the end of the mound is approached, mechanism 14 moves progressively into the horizontal position shown in FIG. 2. In moving to and from the inclined position, mechanism 14 continues to operate inasmuch as pulley 98 moves through a relatively small arcuate distance as beam 70 pivots with respect to assembly 12. Hence, belt 96 is maintained on pulleys 54, 94 and 98 so as to uninterruptedly rotate shaft 46. For this reason, pulley 98 is disposed in relatively close proximity to universal joint 78.

Mechanism 14 is swingable through an arcuate distance relative to assembly 12 so as to be able to be utilized in fields which have elongated, spaced mounds for irrigation purposes. Since the crop on the mounds can be cut at the same time as the crop between the mounds, only one pass over the field is required and the cost of cutting the crop is therefore, maintained at a minimum.

Apparatus 10 is relatively simple in construction and economical in operation inasmuch as no external power source is required for operating mechanism 14. In addition, guard 42 protects blades 56 as the same rotate at high speed under the influence of shaft 46 so as to minimize the cost of replacement of blades 56.

Having thus described the invention, what is claimed as new and desired to be secured by Letters Patent is:

1. Crop-cutting apparatus comprising:
   a support movable over the ground;
   a cutter assembly mounted on the support for movement therewith over one stretch of ground and disposed for cutting a growing crop on said one stretch;
   means on said assembly for sweeping the crop cut threby rearwardly thereof;
   a cutter mechanism secured to the support at the side of said assembly for movement under the influence of the support over a second stretch of ground extending longitudinally of said first stretch, said mechanism being disposed for cutting a growing crop on said second stretch; and
   means on said mechanism for directing the crop cut thereby into the path of said sweeping means, whereby the crop cut by said assembly and said mechanism will be simultaneously swept rearwardly, said assembly including an operable drive unit, said mechanism having a rotatable blade and means coupled with said blade for rotating the same in response to the operation of said drive unit.

2. Crop-cutting apparatus as set forth in claim 1, wherein said mechanism is pivotally mounted on said support.

3. Crop-cutting apparatus as set forth in claim 1, wherein said rotating means is connected to said drive unit, said mechanism being mounted for pivoting movement with respect to said support about an axis disposed in relatively close proximity to the connection between said drive unit and said rotating means.

4. Crop-cutting apparatus as set forth in claim 1, wherein said crop-directing means includes a detector disposed for moving the crop cut by said mechanism laterally of the latter.

5. Crop-cutting apparatus as set forth in claim 4, wherein said mechanism includes a rotatable blade, said deflector including a first baffle above the path of rotation of said blade and disposed substantially radially with respect to the axis of rotation thereof, and a second baffle extending downwardly from said first baffle and laterally outwardly of the axis of rotation of said blade.

6. A crop-cutting attachment as set forth in claim 1, wherein said support includes a housing having a opening therein and a beam extending outwardly from the housing, said mechanism including cutting means disposed within said housing, and hinge structure including a pair of spaced hinge members on the housing and said beam respectively for securing the mechanism to the support, said opening being disposed for passing the crop cut by said cutting means.

References Cited by the Examiner

UNITED STATES PATENTS

| 1,299,685 | 3/1919 | Czaran | 56—6 |
| 1,509,124 | 9/1924 | Bloor | 56—6 |
| 2,576,886 | 11/1951 | McCoy | 56—192 X |
| 3,012,389 | 12/1961 | Jacobs | 56—6 |
| 3,068,630 | 12/1962 | Caldwell | 56—6 |

FOREIGN PATENTS 245,100    5/1963    Australia.

ABRAHAM G. STONE, *Primary Examiner.*

RUSSELL R. KINSEY, *Examiner.*